Feb. 27, 1968          C. E. BERRY          3,371,205

MULTIPOLE MASS FILTER WITH A PULSED IONIZING ELECTRON BEAM

Filed Nov. 17, 1964          2 Sheets-Sheet 1

INVENTOR.
CLIFFORD E. BERRY
BY
Christie, Parker & Hale
ATTORNEYS.

Feb. 27, 1968  C. E. BERRY  3,371,205
MULTIPOLE MASS FILTER WITH A PULSED IONIZING ELECTRON BEAM
Filed Nov. 17, 1964  2 Sheets-Sheet 2

INVENTOR.
CLIFFORD E. BERRY
BY
Christie, Parker & Hale
ATTORNEYS

United States Patent Office 3,371,205
Patented Feb. 27, 1968

3,371,205
MULTIPOLE MASS FILTER WITH A PULSED
IONIZING ELECTRON BEAM
Clifford E. Berry, deceased, late of Altadena, Calif., by
Jean R. Berry, executrix, Altadena, Calif., assignor to
Consolidated Electrodynamics Corporation, Pasadena,
Calif., a corporation of California
Filed Nov. 17, 1964, Ser. No. 412,296
4 Claims. (Cl. 250—41.9)

ABSTRACT OF THE DISCLOSURE

A non-magnetic multipole mass filter wherein ions to be analyzed are formed within the analyzing fields of the filter eliminating the problem of passing ions into the filter through fringing electric fields existing at the entrance end of the filter.

---

This invention is related to a multipole mass filter which has improved operating characteristics and a high collection efficiency.

The basic function of any mass filter is to separate or select ions having different mass-to-charge ratios. The multipole mass filter performs this function without a magnet as is used in most mass spectrometers, and utilizes the motion of charged particles in an electric field having both alternating and static electric components.

The multipole mass filter consists generally of four electrodes in the form of parallel cylindrical rods arranged symmetrically about a central axis. The rods are electrically connected in pairs with opposing rods connected together. If Z denotes the central axis of the rods, then one pair of rods lie with their centers on the X-axis, and the other pair lie with their centers on the Y-axis, according to the convention of a rectangular cartesian coordinate system. The rods are excited by both AC and DC voltages. Ions are introduced at one end of the filter and travel generally down the central axis of the filter. For a given multipole mass filter, those ions with the proper mass-to-charge ratio are impinged upon a collector electrode. The magnitude of the collector current is proportional to the rate at which ions traverse the filter. Ion selection is controlled by varying the frequency of excitation and the applied voltages. An example of a conventional quadrupole mass filter is disclosed in the patent to Paul et al. 2,939,952.

A conventional multipole mass filter has a fringing electrostatic field which deflects some ions as they enter the filter. In general, this ion deflection reduces the probability of the ion traversing the filter even though the ion has the right mass-to-charge ratio. If the entrance fringing field were eliminated, the power required to operate the filter could be decreased while maintaining the collector efficiency and resolution.

This invention eliminates the entrance fringing field problems by forming ions within the mass filter between the ends of the electrodes so the ions are not required to pass through a fringing field. The formation of ions between the electrode ends improves collection efficiency by limiting the number of ions which would otherwise strike the electrodes.

Further, in accordance with the invention, ions are formed between two separate sets of electrodes with a bias voltage imposed between the two sets to give axial acceleration to the ions and divert positive and negative ions toward opposite ends of the filter at separate collectors.

The mass filter in accordance with the present invention includes a plurality of elongated substantially coextensive electrodes spaced about a central axis. Means for applying both AC and DC voltages are coupled to the electrodes to produce both static and alternating field components between the electrodes. A means for forming ions is disposed between the ends of the electrodes.

In another embodiment of the present invention, a multipole mass filter includes a plurality of electrodes severed to form two sets of electrodes, each being aligned and spaced about a central axis. A means for applying both an AC and DC voltage is coupled to the electrodes to produce a static and an alternating electric field component. An electron beam generator is disposed between the two sets of electrodes such that a beam of electrons may impact gas molecules introduced into the mass filter in the vicinity of the electrode central axis. A means for imposing axial acceleration to the ions is supplied by a bias voltage applied between the two sets of electrodes to accelerate positive and negative ions toward a respective collector disposed on opposite ends of the two electrode sets.

The present invention will become more apparent with reference to the description and accompanying drawings in which.

Figure 1:
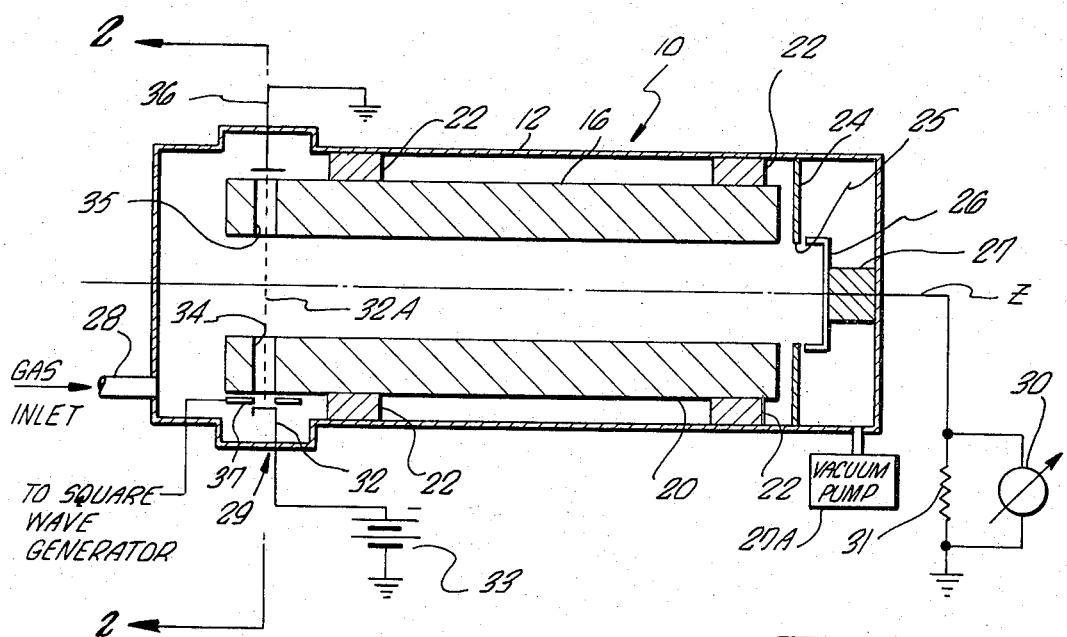
FIG. 1 is a schematic longitudinal cross-sectional view through a quadrupole mass filter in accordance with one form of the present invention.
Figure 2:
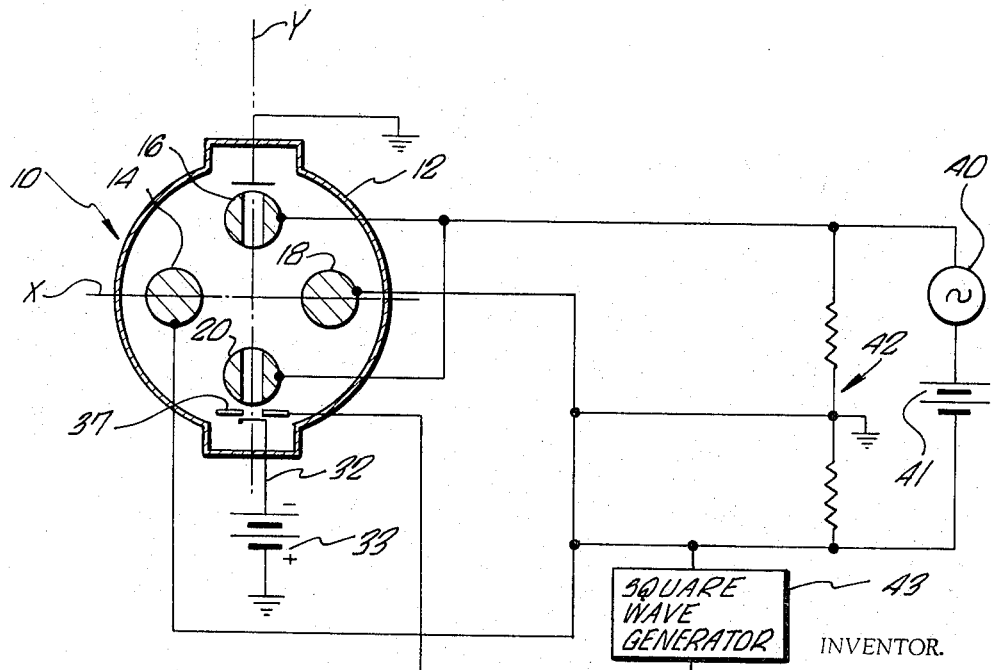
FIG. 2 is a schematic cross-sectional view cut along line 2—2 of FIG. 1 through an electron beam generator and including a circuit for operating the filter.

Referring to FIGS. 1 and 2, a quadrupole mass filter 10 includes a hollow cylindrical metallic housing 12 containing four primary electrodes 14, 16, 18, and 20 mounted on electrical insulating supports 22. The primary electrodes are parallel, coextensive cylindrical metallic rods disposed symmetrically about a central axis Z of the filter. Diametrically opposed rods 14 and 18 lie with their centers on an X-axis and are called the X-rods. The other pair of opposed rods 16 and 20 lie with their centers on a Y-axis and are called the Y rods. Theoretically, the rods should have a hyperbolic curvature in cross section for best results. However, in practice the cylindrical curvature is an adequate approximation.

A transverse conductive cylindrical plate 24 is mounted within and adjacent a rear end of the housing 12, and includes a centrally located circular aperture 25 serving as an ion exit aperture for the filter. An ion collector electrode 26 is mounted within and at the rear of the housing 12 upon an electrical insulator 27 opposite the ion exit aperture 25.

In use, the filter 10 is evacuated by a conventional vacuum pump 27A and a gas inlet 28 is used to introduce a gaseous sample into the filter housing 12 where it is ionized by an electron beam generator generally indicated at 29. Some of the ions formed within the housing 12 traverse the filter and impinge upon the collector electrode 26. The ion current is measured by any conventional measuring circuit, say, a meter 30 connected across a resistor 31 that is connected between the collector electrode 26 and ground.

The electron beam generator 29 includes a cathode 32 powered by a DC current source, say, a battery 33, that is connected between the cathode and ground. The Y rods 16 and 20 both have perforations 34 and 35 which are positioned at right angles relative to the central axis Z and are both aligned with each other. The cathode 32 is positioned adjacent the perforation 34 in the rod 20 and so aligned that when energized, an electron beam 32A passes from the cathode through the perforations 34 and 35 and impinges upon an anode 36 mounted adjacent the perforation 35 and the rod 16. The anode 36 is grounded to complete the electron beam generator circuit. A control grid 37 is mounted between the cathode 32 and the rod 20 and serves to limit the flow of electrons between the cathode 32 and the anode 36 during intermittent periods and will hereinafter be described in detail.

A schematic circuit for applying and controlling voltages on the electrodes is shown in FIG. 2. A radio frequency generator 40 has a peak voltage output and a frequency which are both adjustable and are used to supply AC signals across the pairs of electrodes 14, 18, and 16, 20. A source of DC voltage such as a battery 41 is also coupled across both pairs of electrodes 14, 18 and 16, 20. A voltage divider 42 has its central tap grounded and is coupled across the RF generator 40 and the battery 41. A square wave generator 43 is coupled in series with the control grid 37 and the RF generator 40 for pulsing square wave voltages in phase relative to the output of the RF generator. The square wave generator 43 biases the control grid 37 to an extent that the electron beam generator 29 is biased to cut off the electron beam during each negative half cycle of AC voltage delivered by the RF generator 40 to the Y electrodes. The electron beam is collimated by the electric fields during each positive half cycle of the AC voltage applied to the Y electrodes. When the electrodes are negative, electrons experience a transverse acceleration away from the central axis and thus would laterally fan out and strike the electrodes. The square wave generator is but one of the devices which can cut off the electron beam during the negative cycle of the RF voltage and other suitable devices may be substituted.

Figure 3:
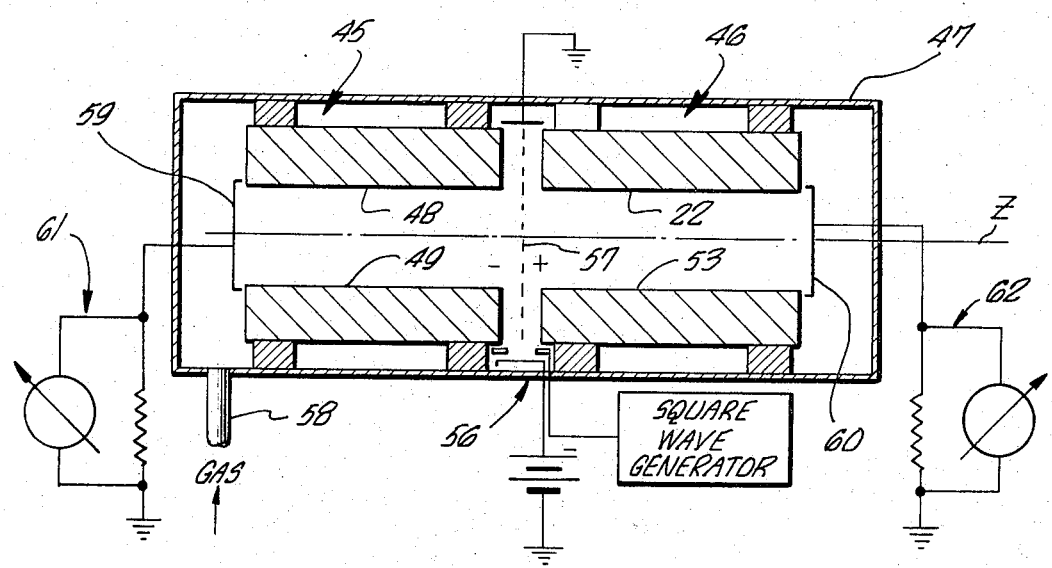
FIG. 3 is a schematic longitudinal cross-sectional view of another embodiment of the mass filter in accordance with the present invention.
Figure 4:
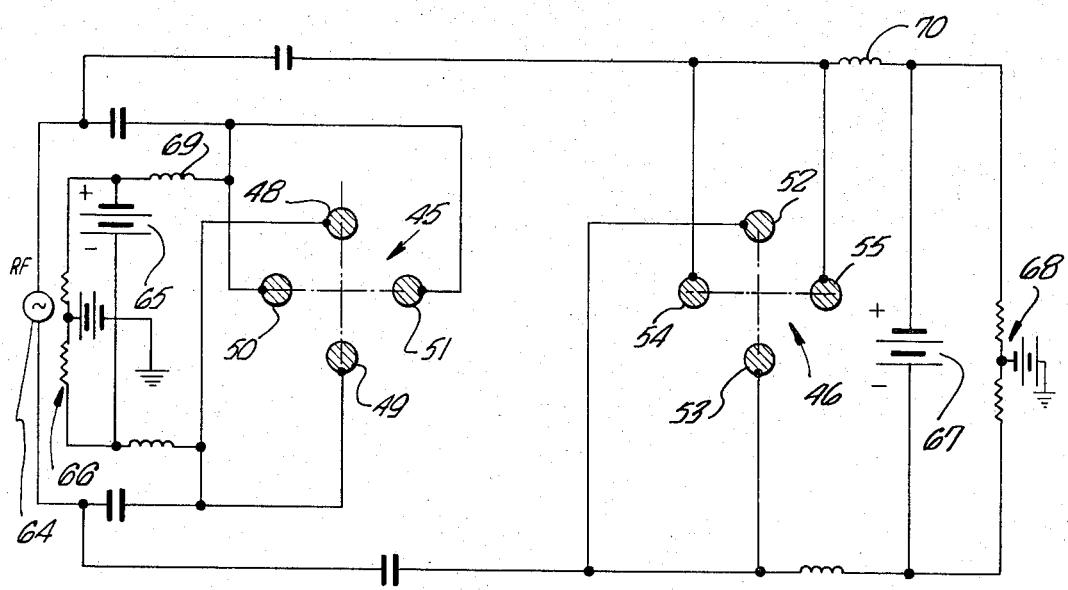
FIG. 4 is a schematic diagram of an electrical circuit for controlling the voltages applied to the two sets of electrodes in the mass filter illustrated in FIG. 3.

Referring now to FIGS. 3 and 4, there is illustrated another embodiment of the present invention. The mass filter includes a hollow cylindrical metallic housing 47 having two sets of electrodes 45 and 46 spaced about a central axis Z. The first set of electrodes 45 includes two pairs of Y electrodes 48 and 49 disposed opposite each other and a second pair of X electrodes 50 and 51 also disposed opposite each other and spaced equally from the central axis Z. The second set 46 includes a first pair of Y electrodes 52 and 53 and a second pair of X electrodes 54 and 55 each being disposed symmetrically about the central axis Z and respectively collinear with electrodes 48, 49, 50 and 51.

An electron beam generator 56 is disposed between the two electrode sets 45 and 46 to direct an electron beam 57 substantially perpendicular to the central axis Z. Gas molecules entering a gas inlet 58 are ionized by the electron beam 57. Positive ions are given an axial acceleration toward a first collector electrode 59 at the left (as viewed in FIG. 3) of the housing. Negative ions formed by the electron beam 57 are given an axial acceleration through the second set 46 of electrodes toward a second collector electrode 60. The purpose of splitting the electrodes into two sets is to apply an axial acceleration to the ions formed by the electron beam. There are situations in which the positive and negative ions are separately considered and in these situations the present invention is most valuable. Measuring circuits 61 and 62 are respectively coupled to the collectors 59 and 60 to sense the collector current in each case which is a measure of the number of ions striking each respective collector.

A schematic circuit is illustrated in FIG. 4 and includes an RF generator 64 which has an adjustable frequency and peak voltage output; the generator 64 supplies balanced AC signals through capacitative coupling across the two electrode sets 45 and 46. The RF generator 64 is individually coupled across the pairs of electrodes 48, 49, and 50, 51, as well as electrodes 52, 53, and 54, 55. A source of DC voltage, say a battery 65, is coupled across a voltage divider 66 and is coupled to the first set 45 of electrodes through an RF choke 69 to the opposite pairs of electrodes 50, 51, and 48, 49. Another source of DC voltage, say, a battery 67, is coupled across a voltage divider 68 and through an RF choke 70 to opposite pairs of the second electrode set 46. The batteries 65 and 67 provide a small bias voltage between the two sets 45 and 46 and thus provide a small axial acceleration of the ions formed by the electron beam 57.

The square wave generator used with the present invention may be removed and a triangular wave generator substituted without departing from the scope of the present invention. Either of these generators can be phase adjustable in order to cut off any portion of the cycle of the AC voltage impressed on the rods.

What is claimed is:
1. In a multipole mass filter comprising:
    a plurality of elongated electrodes spaced about a central axis,
    the electrodes having coextensive portions,
    means coupled to the electrodes for applying a DC voltage to produce a static multipole electric field component between the electrodes,
    means coupled to the electrodes for applying an AC voltage to produce an alternating electric field component between the electrodes,
    an electron beam generator disposed adjacent the electrodes and oriented with respect to the electrode central axis such that an electron beam passes through the electrode central axis at a point within the coextensive portions of the electrodes,
    means for introducing gas into the mass filter such that the gas molecules impacted by the electrons from the generator will be ionized,
    means coupled with the electron beam generator for terminating the electron beam during negative half cycles of the alternating field component to prevent the dispersion of the electrons during this period, and
    means located at one end of the filter for detecting ions of a predetermined mass to charge ratio.

2. A multipole mass filter comprising:
    a plurality of elongated electrodes disposed about a central axis, the electrodes having coextensive portions,
    a source of AC voltage,
    a source of DC voltage,
    means coupled to the electrodes and the DC source for applying a DC voltage to produce a static multipole electric field component between the electrodes,
    means coupled to the electrodes and to the AC source for applying an AC voltage to produce an alternating electric field component between the electrodes,
    an electron beam generator disposed adjacent the electrodes and oriented with respect to the electrode central axis such that an electron beam passes through the electrode central axis at a point within the coextensive portions of the electrodes, the generator including a control grid coupled to a control circuit arranged to cut off the electron beam during negative half cycles of the voltage from the AC source,
    means for introducing gas into the mass filter such that the gas molecules impacted by the electrons from the generator will be ionized, and
    means located at one end of the filter for detecting the presence of ions of a predetermined mass to charge ratio.

3. A quadrupole mass filter comprising:
    a plurality of elongated electrodes symmetrically disposed about a central axis and defining an analyzing region the electrodes having coextensive portions, two of the electrodes having aligned apertures therein, the axis of said apertures being oriented transversely of the electrode central axis,
    a source of AC voltage,
    a source of DC voltage,
    means coupled to the electrodes and to the DC source for applying a DC voltage to produce a static multipole electric field component between the electrodes, means coupled to the electrodes and to the AC source for applying an AC voltage to produce an alternating electric field component between the electrodes, an electron beam generator including a cathode disposed adjacent one of the electrode apertures externally of the analyzing region, an anode disposed adjacent the other electrode aperture externally of the analyzing region, and a control grid disposed between the cathode and its adjacent apertured electrode, the cathode and anode being oriented in a manner that when energized an electron beam is produced along the aperture axis, a square wave generator coupled to the AC source and the control grid and being arranged to cut off the electron beam between the cathode and the anode during negative half cycles of the voltage from the AC source, means for introducing gas molecules into the mass filter for ionization by the electron beam, and means located at one end of the filter for detecting the presence of ions of a predetermined mass to charge ratio.

4. A multipole mass filter comprising:
a first set of elongated electrodes symmetrically spaced about a central axis,
a second set of elongated electrodes symmetrically spaced about the central axis, said second set of electrodes being located adjacent to and spaced from said first set,
a positive ion collector electrode disposed at one end of the mass filter,
a negative ion collector electrode disposed at the opposite end of the mass filter,
a source of AC voltage,
a source of DC voltage,
means coupled to the electrodes of each set and to the DC source for applying a DC voltage to produce a static multipole electric field component between the electrodes,
means coupled to the electrodes of each set and to the AC source for applying an AC voltage to produce an alternating multipole electric field component between the electrodes,
an electron beam generator located between the electrode sets for impacting gas molecules with electrons such that ions are generated within the vicinity of the central axis of the electrodes and are subjected to uniform static and alternating electric field components,
means for interrupting the flow of electrons from the electron beam generator during negative half cycles of the alternating voltage from the AC source, and
means for connecting a biasing voltage to the electrode sets for accelerating positive ions in one direction and negative ions in the opposite direction along the central axis of the two sets of electrodes such that positive and negative ions of predetermined mass to charge ratios are detected at the positive and negative ion collector electrodes respectively.

References Cited

UNITED STATES PATENTS

| | | | |
|---|---|---|---|
| 2,939,952 | 6/1960 | Paul et al. | 250—41.9 |
| 2,999,157 | 9/1961 | Rosenstock | 250—41.9 |
| 3,258,591 | 6/1966 | Blauth et al. | 250—41.9 |

WILLIAM F. LINDQUIST, *Primary Examiner.*

RALPH G. NILSON, *Examiner.*